July 21, 1964   R. G. WOOLWORTH   3,141,422
PALLETS

Filed Dec. 21, 1961   3 Sheets-Sheet 2

United States Patent Office 3,141,422
Patented July 21, 1964

3,141,422
PALLETS
Richard G. Woolworth, Lancaster, Pa., assignor to Animal Trap Company of America, Lititz, Pa., a corporation of Pennsylvania
Filed Dec. 21, 1961, Ser. No. 161,217
6 Claims. (Cl. 108—56)

This invention relates generally to pallets and more particularly to knock-down pallets and the method and apparatus of making them.

Attempts have been made to commercially produce pallets made of paper products, or the like, most of which are corrugated cardboard constructions. Paper fiber product pallets as a group have an advantage in that they are lighter in weight and generally less expensive to manufacture than metal and wooden pallets. Many of the molded pulp pallets heretofore developed, as well as wooden and metal pallets, cannot be nested and stacked and require considerable space for storage. Heretofore molded pulp pallets were generally made with the legs integral with a load-supporting platform which makes them more expensive than they need be. Others are made with means for retaining the legs in spaced positions on a first platform and a second platform is employed as a load-supporting platform.

Constructions of pallets with detachable legs have been made in which a wound corrugated paper-board leg construction is employed and wooden reinforcing slats are employed as part of the supporting members to strengthen the pallets against lateral thrust inherent in industrial fork truck operations. Certain constructions of pallets of paper-board and pulp are made with very light materials which are incapable of supporting heavy loads and are intended to be disposable.

A principal object of the present invention is to provide knock-down, reusable pallets made of molded pulp and paper-board or other suitable materials, for example plastics and the like, which can be readily stored in stacked relationship or the component parts thereof stored independently.

Another object of the present invention is to provide an inexpensive pallet in which the legs thereof are made of molded pulp and form the sole-load-supporting components of the assembled pallet.

Another object of the present invention is to provide a pallet in which the legs can be readily detached from a spacing member for easy storage.

Still another object is to provide a simple, inexpensive method and completely automatic apparatus for mass producing the component parts of pulp pallets, which can be readily manually assembled into a pallet and disassembled without tools, without other operations than those performed automatically.

A feature of the invention is the provision of a method and apparatus of automatically molding pulp legs which are each provided with a load-supporting peripheral flange extending radially outwardly of a body portion of the leg. The legs are automatically formed with projections or ears having a top surface forming a shoulder spaced radially outwardly from the legs and radially downwardly from the lower surface of the aforementioned flange for assembly with a sheet of paper-board material holding the legs in spaced apart, fixed positions. Because of fuzzy surfaces on the projection or ear the legs may be frictionally locked on the aforementioned spacing member which is a sheet of material provided with holes through which the legs are inserted and the flanges and ears cooperate therewith in fixing the legs thereon.

Another feature of the invention is the method and apparatus by which a space or slot is automatically formed between the aforementioned ears and flange during the molding operation of the load-support legs to form a shoulder surface permitting integral assembly of the legs with the spacing member of sheet paper-board material.

Other features and advantages of the pallet, method and apparatus in accordance with the present invention will be better understood as described in the following specification and appended claims, in conjunction with the following drawings, in which:

Figure 1:
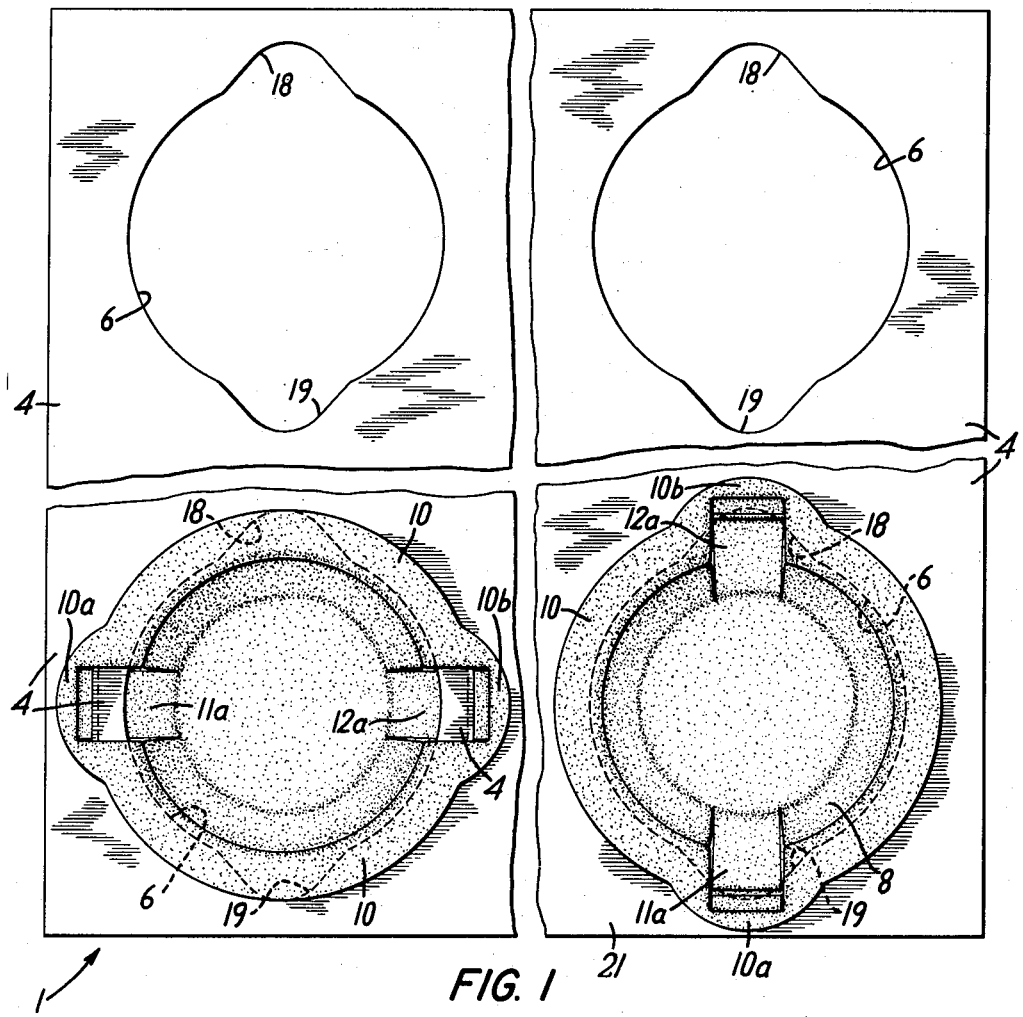
FIG. 1 is a plan view of a pallet, according to the invention, and is illustrative of the construction and assembly of a retaining sheet and cooperative load-supporting legs.
Figure 2:
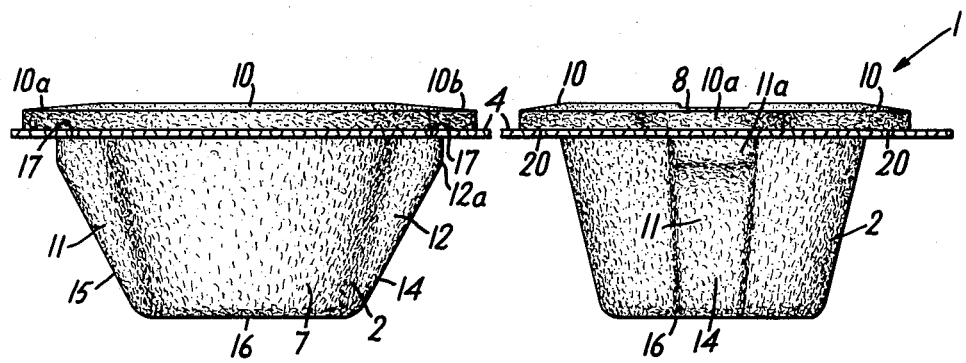
FIG. 2 is an elevation side view of the pallet illustrated in FIG. 1.
Figure 3:
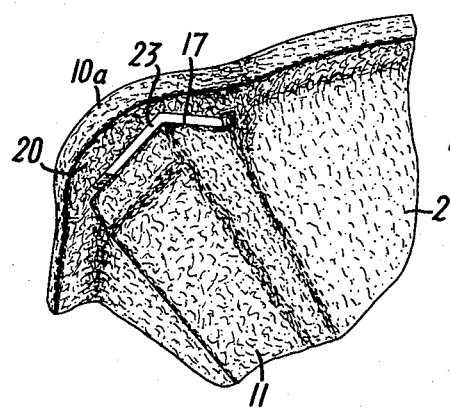
FIG. 3 is a fragmentary perspective view of the underside of a leg of the pallet illustrated in FIG. 2 and is illustrative of the construction of ears formed automatically on the body of the individual legs.
Figure 6:
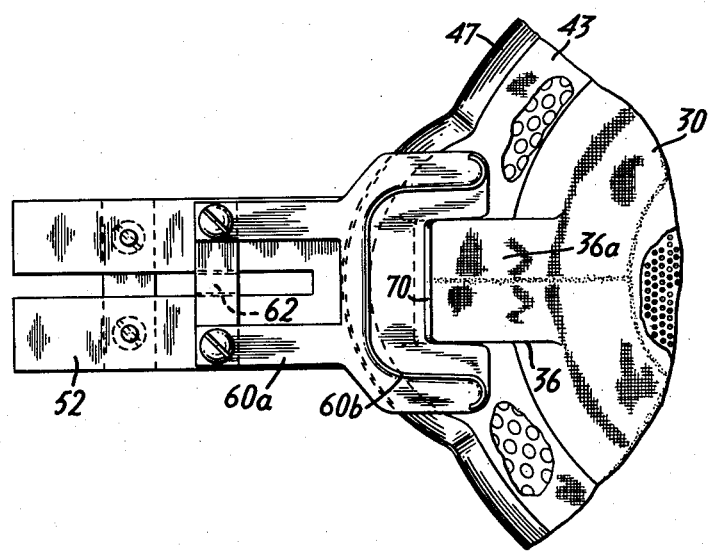
FIG. 6 is a fragmentary plan view of the apparatus in FIG. 4 and is illustrative of means for forming slots above the projections illustrated in FIG. 3.
Figure 7:
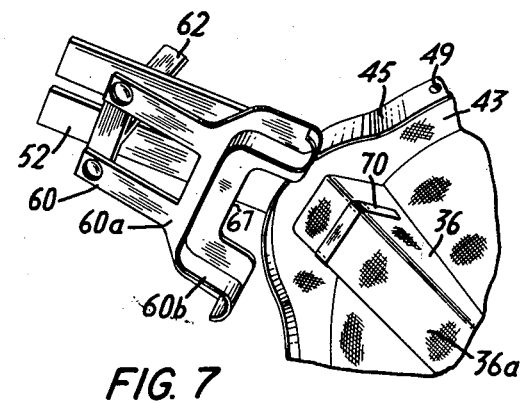
FIG. 7 is a fragmentary perspective view of the apparatus in FIG. 6 viewed from below during a retracted operative position of the finger means forming the slot illustrated in FIG. 3.

Referring to the drawings, and more particularly FIGS. 1–3, a pallet 1, according to the present invention, comprises a plurality of spaced apart alike molded pulp legs 2 defining spaces therebetween to receive a device for lifting the pallet, as for example a fork truck, not shown. A flat retaining sheet 4 made, for example, of corrugated cardboard retains the legs in a spaced apart condition. The sheet is provided with a plurality of spaced openings 6 for receiving and holding the legs 2 in position depending from the openings as illustrated in FIG. 2.

The legs 2 each comprise a frusto-conical, tubular unitary body portion 7 having an open end 8 and load-supporting sidewalls which are provided with a continuous load-supporting flange or rim 10 extending peripherally of the open end of the legs. Each of the legs 2 is provided with radially opposed projections or ears 11, 12 which extend radially outwardly of the body of the leg and extend in a circumferential direction as illustrated in the drawing and extend axially on the leg. The projections or ears each have an outermost flat surface 14, 15 which tapers downwardly and merges smoothly with a bottom 16 of the leg closing one of the ends of the tubular body portion of the leg. The projections or ears 11, 12 are each provided with an upper surface spaced downwardly from the underside surface 20 of the flange 10, which forms a shoulder 17 on which the sheet 4 rests when assembled as hereinafter described.

The openings 6 of the retaining sheet 4 are provided with radially opposed recesses 18, 19 which receive the leg projections 11, 12. In assembling the pallet the legs are inserted with the ears or projections thereon in registry with the recesses in the retaining sheet, as illustrated in the lower right-hand portion of FIG. 1, so that the lower surface 20 of the peripheral flange rests on an upper surface 21 of the retaining sheet 4.

Figure 4:
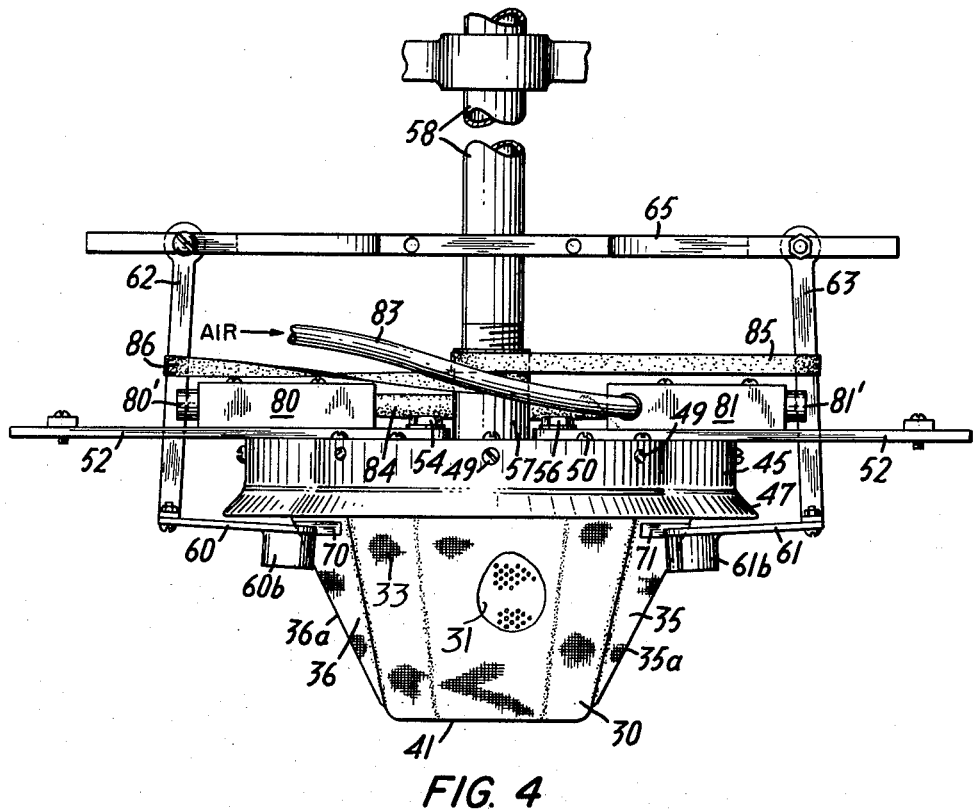
FIG. 4 is an elevation view of apparatus for molding the legs of the pallet illustrated in FIGS. 1 and 2.

To maintain the legs in an assembled condition with the retaining sheet the legs are then rotated, for example, a full 90° as illustrated in the lower left-hand portion of FIG. 4. In order to permit the rotation in this manner the legs are formed with a space or slot 23 defined, FIG. 3, between the lower surface 20 of the flange and the shoulder 17. The ears 11, 12 are molded so that they form internally of the legs respective recesses 11a, 12a which are in communication with the interior of the hollow legs. These recesses extend from the top surface of respective flange opposed projections 10a, 10b, down to the bottom of the legs. The spaces 23 are, therefore, slots into which the retaining sheet is inserted and into which it extends as the legs are rotated into the locked position shown in the lower left-hand portion of FIG. 1. The shoulder-defining upper surface of the projections or ears have fibers that frictionally engage the retaining sheet so that the legs are held in an angularly fixed position relative to the sheet 4.

In this manner the knock-down pallet can be readily assembled without need of tools. The disassembly is accomplished by simply rotating the legs back into a position where the ears 11, 12 register with the corresponding recesses 18, 19 and then the legs can be readily withdrawn. It is apparent, therefore, that retaining sheets and legs can be stored in stacked relationship either in an assembled or in a disassembled condition.

Moreover, the load supporting flanges 10 of each of the legs taper somewhat downwardly as do the radially opposed projections 10a, 10b that project out radially a greater extent than the respective ears 11, 12 with which they are in angular registry and which they overlie. Thus, the lower surface 20 also frictionally engages the top face surface 21 of the retaining sheet 4. The flange projections bear on the retaining sheet upper surface and urge the underside into frictional engagement with the surface 17, thereby tending to hold the legs in their angular positions. In an assembled condition the load is supported on the legs. It is to be understood that the retaining sheet 4 needs to be only sufficiently strong enough to hold the legs in spaced apart, fixed positions and need not have the strength necessary to support heavy loads since all of the load is supported on the molded pulp legs.

In order to economically construct the pulp legs they are molded by a method and apparatus hereinafter described. Apparatus, according to the invention, for molding the legs is illustrated in the drawings, FIGS. 4–7, as comprising a hollow mold 30 having a body constructed of a perforated sheet material, for example of a perforated corrosion-resistant metal, as fragmentarily illustrated at 31, exteriorly of which is provided a corrosion-resistant wire mesh as illustrated at 33. The mold is pervious to a fluid. The mold body is provided with fluid-pervious radially opposed ears or projections 35, 36 which extend radially outwardly from the body and are integral therewith. The interior of these projections is in communication with the interior of the hollow mold. These projections have outside surfaces 35a, 36a which taper downwardly and are employed to form the ears 11, 12 in the finished support legs heretofore described. The mold comprises a bottom 41 likewise constructed pervious to a fluid in the manner heretofore described with respect to the body sidewalls and projections thereon. The mold is formed with an open top end circumferentially of which extends a rim or flange 43 extending radially outwardly of the sidewalls defining the body of the mold. This flange is also constructed of the same fluid-pervious screen and perforated metal.

The open end of the mold is closed by a cover 45 provided with a flared rim 47. The mold flange 43 is received in the cover 45 and a substantially liquid-tight seal is made with the mold flange. The mold is held in position in the cover by a plurality of screws 49 engaging a rim, not shown, on the flange and by screws 50 threaded into the flange itself. The cover is secured to two radially extending brackets 51, 52 by body bolts 54, 56. These brackets support the entire mold assembly on mechanism, not shown, for transporting the mold into a pulp slurry and removing it therefrom in molding the pallet legs 2. The cover 45 is provided with a bushing 57 fixed thereto to which is connected a conduit 58, and a flexible hose, not shown, for applying a vacuum, by means of a vacuum-applying pump, not shown, internally of the mold 30 or alternatively applying a pressure greater than atmospheric pressure therein as hereinafter described.

The apparatus comprises mechanism for automatically forming the slots 23 on the molded legs during molding thereof. This is accomplished by provision of a pair of bifurcated fingers 60, 61 which are secured to operating rods 62, 63 pivotally mounted on a yoke 65. The bifurcated fingers 60, 61 are each provided with a bifurcated end 60a, 61a, in the manner illustrated in FIGS. 6 and 7. In order to simplify the drawings only one of the fingers is shown in an enlarged scale in FIG. 7. The bifurcated ends thereon each comprise a recess 67 which conforms to the outer surface 35a, 36a of a corresponding projection 35, 36 with which the fingers cooperate as herein described in detail. The bifurcated portions 60a, 61a are configured to engage an upper portion of the corresponding projection on the mold and overlie a respective fluid-impervious strip, for example a metal strip 70, 71 mounted, for example by welding, on each of the projections to render that portion of the projection covered by the impervious strip completely impervious to fluid upon the application of a vacuum to the mold.

In order to carry out the molding operation the mold 30 is completely dipped into a slurry having pulp in suspension therein. The pulp slurry preferably comprises a suitable material for bonding the pulp fibers after molding the legs 2 as hereafter described. When the mold 30 is dipped into the pulp slurry it defines an elongated frusto-conical space internally of the slurry which is substantially free of pulp and corresponds in volume and configuration to the space of the tubular article or legs to be molded. The radially extending projections, of course, define smaller spaces having communication with the main space defined by the mold. A vacuum is applied by the vacuum pump, not shown, through line 58 and the bushing 57 so that a negative pressure is formed internally of the mold 30 or space defined by it in the slurry to cause pulp to blanket the mold 30 throughout its outer sidewall surfaces and bottom as well as the underside surface of the flange 43 and adhere thereto during application of the vacuum.

While the mold is dipped in the slurry with a vacuum applied thereto the fingers 60, 61 are automatically oscillated by a pair of actuating air cylinders 80, 81 having pistons 80', 81' reciprocable therein connected to the operating rods 62, 63 as shown. Air pressure is applied to the cylinders intermittently from a source, not shown, through hoses 83, 84 to move the operating rods 62, 63 radially outwardly with respect to the mold and mold cover 45 against pressure applied radially inwardly by resilient rods 62, 63 as shown. When the air is cut off the resilient bands 85, 86 draw the depending operating rods 62, 63 radially inwardly thereby causing the respective recesses 67 of the bifurcated ends 60a, 61a of the fingers 60, 61 to overlie the corresponding fluid-impervious strips 70, 71 or regions defined thereby. The regions defined thereby are, therefore, not blanketed by the pulp and the reciprocable, cyclical activation of these fingers causes the slots 23 to be automatically formed during the molding operation. The bifurcated ends of the fingers 60, 61 are each provided with a depending flare 60b, 61b which is spaced apart from the recesses 67 and allow pulp slurry to flow in between the flare and the mold projection when the fingers are seated on the impervious strips they overlie and seat on. The flarings 60b, 61b form the flattened parts of the projections as shown at 11a, 12a and compact the pulp on the projections and preclude the fingers from tearing away the blanket of pulp as they are repetitively oscillated to form the slots. Thus, a substantially uniform thickness of the pulp blanket is maintained over the mold at all points except in the zones where the slots are being formed.

Figure 5:
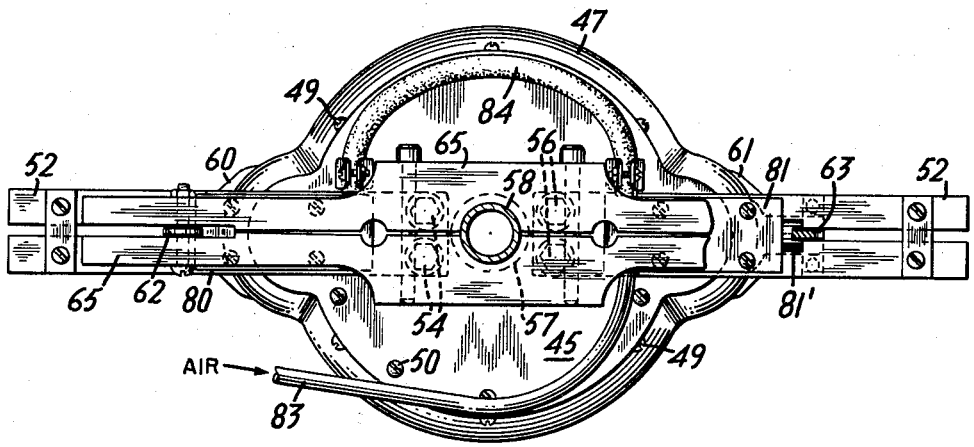
FIG. 5 is a plan view of the apparatus shown in FIG. 4.

The mold transport mechanism, not shown, withdraws the mold assembly shown in FIGS. 4 and 5 from the pulp slurry and the finished molded leg is ejected automatically from the mold assembly by the application of a positive pressure greater than atmospheric through the line 58. The frusto-conical shape of the mold and tapered surfaces on the opposed projections of the mold permit an easy ejection. It will be understood that the fingers 60, 61 are operated to a retracted position when the finished molded legs are ejected. The molded legs are ejected, for example, onto a travelling conveyor and then set.

The pulp slurry preferably contains a suitable resinous compound that bonds the pulp fibers so that they are held in fixed relationship when the pulp is set. It will be understood by those skilled in the art that the various successive operations of the apparatus, for example, cyclical oscillation of the actuating air cylinders, the application of a vacuum and a positive pressure and the sequencing of the transport mechanism is all accomplished in timed relationship by the apparatus using known mechanisms and timing devices, not shown.

While a preferred embodiment of the present invention has been shown and described, it will be understood that many modifications and changes can be made within the true spirit and scope of the invention.

What I claim and desire to secure by Letters Patent is:

1. A knock-down pallet comprising, a plurality of spaced apart legs defining spaces therebetween to receive a device for lifting the pallet, a retaining sheet for retaining the legs spaced apart, said sheet having spaced openings for receiving said legs and holding said legs in position depending from said openings, said legs each comprising a body portion having an end and load-supporting walls provided with a load-supporting flange extending circumferentially of said end and radially of said body portion, each of said legs having at least one radial projection on the body portion extending axially of the leg body portion and in a circumferential direction thereof a given extent, said projection having an upper end surface terminating the projection disposed spaced downwardly from a lower face surface of said flange portion thereby defining a shoulder on said leg, said openings each having at least one radial recess for receiving said radially extending projection of a respective leg, said legs being insertable into respective ones of said openings with said projection thereof in registry with said recess, said recess being dimensioned to allow the flange on the individual legs to rest on a common side of said sheet when said legs are inserted in respective openings, and said space between the upper end of said shoulder-forming projection and said lower surface of said flange portion having a sufficient axial height to allow angular rotation of each leg relative to said sheet when inserted in a respective opening with said projection in registry with said radial recess and said shoulder and underside of said flange on said legs being spaced apart and cooperating with opposite sides of said sheet to hold the individual legs in fixed angular positions relative to said sheet, whereby upon angular rotation of each leg relative said sheet after insertion in a respective opening each leg is held in fixed position on said sheet and the sheet and legs are transportable in assembly and are readily disassembled.

2. A knock-down pallet comprising, a plurality of spaced apart molded legs defining spaces therebetween to receive a device for lifting the pallet, a retaining sheet for retaining the legs spaced apart, said sheet having spaced openings for receiving said legs and holding said molded legs in position extending in a common direction from said openings, said legs each comprising a tubular, unitary body portion having an open end and load-supporting walls provided with a continuous load-supporting flange extending circumferentially of said open end, each of said legs having at least one radial projection extending axially of the leg and in a circumferential direction thereof a given extent, said projection having an upper end surface terminating the projection spaced axially from a lower face surface of said flange portion thereby defining a shoulder on said leg, and said openings each having at least one radial recess for receiving said radial projection of a respective leg, said legs being insertable into respective ones of said openings with said projection thereof in registry with said recess thereon, said recess being dimensioned to allow the flange on the individual legs to rest on a common side of said sheet when said legs are inserted in respective openings, said space between the upper end of said shoulder-forming projection and said lower surface of said flange portion having a sufficient axial height to allow angular rotation of each leg relative to said sheet when inserted in a respective opening with said projection in registry with said radial recess and said shoulder and the lower surface of said flange of said legs being disposed for cooperating with opposite sides of said sheet to hold the respective legs in the angular positions relative to said sheet in which the legs are disposed subsequent to angular rotation thereof in said openings, whereby upon angular rotation of each leg relative said sheet after insertion in a respective opening each leg is held in position on said sheet and the sheet and legs are transportable in assembly and are readily disassembled.

3. A knock-down pallet comprising, a plurality of spaced apart molded legs defining spaces therebetween to receive a device for lifting the pallet, a flat retaining sheet for retaining the legs spaced apart, said sheet having spaced openings for receiving said legs and holding said legs in position extending in a common direction from said openings, said legs each comprising a tubular frusto-conical unitary body portion having an open end, closed end, and load-supporting walls provided with a continuous load-supporting flange extending circumferentially of said open end, each of said legs having at least one recess in the interior thereof forming a radial projection externally of the body portion extending axially of the leg the full length of said body portion and in a circumferential direction thereof a given extent, said flange having at least one portion extending radially outwardly of said leg a greater extent than the remaining portions of the flange and disposed in angular registry with said external projection, said body portion having a slot adjacent said portion of said flange in angular registry with said projection thereby forming an upper end surface terminating said projection spaced axially from a lower face surface of said flange portion and thereby defining a shoulder on said leg, said openings each having at least one radial recess for receiving said radial projection of a respective leg, said legs being insertable into respective ones of said openings with said projection thereof in registry with said recess, said recess being dimensioned to allow the flange on the legs to rest on a common side of said sheet when said legs are inserted in respective openings, said slot between the upper end of said projection and said lower surface of said flange portion having a sufficient axial height to allow angular rotation of each leg relative to said sheet when inserted in a respective opening with said projection in registry with said radial recess and said slot being dimensioned in height to allow said upper end surface of said flange and the underside of said flange portion to cooperate with opposite sides of said sheet frictionally to hold said legs in determined angular positions relative to said sheet subsequent to angular rotation of said sheet whereby upon angular rotation of each leg relative said sheet after insertion in a respective opening each leg remains in position on said sheet and the sheet and legs are transportable in assembly and are readily disassembled by rotation of said legs to cause said projections thereon to register with said recess on the respective openings.

4. A knock-down pallet, according to claim 3, in which said molded legs comprise molded pulp.

5. A knock-down pallet, according to claim 3, in which said sheet comprises corrugated cardboard.

6. A knock-down pallet, according to claim 3, in which said recess on said body portion is wedge-shaped and configured to cause said projection to extend radially outwardly of said body the greatest extent adjacent said slot and having its greatest depth adjacent the upper surface of said flange, and said recess having its minimum depth adjacent the closed end of said body portion thereby to cause said projection to merge smoothly with the bottom of said body portion.

References Cited in the file of this patent

UNITED STATES PATENTS

| | | |
|---|---|---|
| 2,149,878 | Mitchell | Mar. 7, 1939 |
| 2,888,221 | Connelly | May 26, 1959 |
| 2,903,218 | Altenburg | Sept. 8, 1959 |
| 3,046,187 | Leitzel | July 24, 1962 |